US011119395B2

(12) United States Patent
Kato et al.

(10) Patent No.: US 11,119,395 B2
(45) Date of Patent: Sep. 14, 2021

(54) IMAGE PICKUP APPARATUS, OPTICAL MEASUREMENT APPARATUS, AND MEASUREMENT SYSTEM

(71) Applicant: Mitutoyo Corporation, Kawasaki (JP)

(72) Inventors: Ryusuke Kato, Tsukuba (JP); Eisuke Moriuchi, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 16/031,406

(22) Filed: Jul. 10, 2018

(65) Prior Publication Data

US 2019/0011823 A1 Jan. 10, 2019

(30) Foreign Application Priority Data

Jul. 10, 2017 (JP) .............................. JP2017-134569

(51) Int. Cl.
*G03B 21/28* (2006.01)
*G02B 27/09* (2006.01)
(Continued)

(52) U.S. Cl.
CPC ......... *G03B 21/28* (2013.01); *G02B 27/0955* (2013.01); *G02B 27/10* (2013.01); *G03B 17/54* (2013.01); *G03B 21/10* (2013.01)

(58) Field of Classification Search
CPC .......... G02B 7/14; G03B 21/10; G03B 21/12; G03B 21/132; G03B 17/54; G03B 21/00–2093; H04N 9/31–3197
See application file for complete search history.

(56) References Cited

U.S. PATENT DOCUMENTS 6,082,865 A * 7/2000 Yamazaki ............ G03B 21/132
353/122
2008/0062683 A1* 3/2008 Belliveau .............. F21S 10/007
362/231
(Continued)

FOREIGN PATENT DOCUMENTS

JP 2008-261721 10/2008

OTHER PUBLICATIONS

Combined Chinese Office Action and Search Report dated Jan. 29, 2021 in Patent Application No. 201810595166.0 (with English language translation), 19 pages.

*Primary Examiner* — Michelle M Iacoletti
*Assistant Examiner* — Christopher A Lamb, II
(74) *Attorney, Agent, or Firm* — Oblon, McClelland, Maier & Neustadt, L.L.P.

(57) ABSTRACT

An image pickup apparatus that is capable of improving measurement accuracy and measurement workability of an optical measurement apparatus, an optical measurement apparatus including the image pickup apparatus, and a measurement system. An image pickup apparatus according to an embodiment includes a base section, a beam splitter, and an image pickup section. The base is configured to detachably attach to an optical measurement apparatus including an optical projection system configured to project an image of a subject on a screen. The beam splitter is disposed on an optical axis of the optical projection system upon attachment of the base to the optical measurement apparatus. The image pickup circuitry includes an image pickup device configured to receive light generated through splitting at the beam splitter and is configured to take an image of the subject upon attachment of the base.

9 Claims, 13 Drawing Sheets

(51) Int. Cl.
*G02B 27/10* (2006.01)
*G03B 17/54* (2021.01)
*G03B 21/10* (2006.01)

(56) References Cited

U.S. PATENT DOCUMENTS

| | | | | |
|---|---|---|---|---|
| 2010/0238141 | A1* | 9/2010 | Kanayama | G03B 17/54 |
| | | | | 345/179 |
| 2011/0122327 | A1* | 5/2011 | Kotani | F16M 11/40 |
| | | | | 348/744 |
| 2012/0007839 | A1* | 1/2012 | Tsao | G02B 26/00 |
| | | | | 345/204 |
| 2013/0286264 | A1* | 10/2013 | Kamikura | G03B 21/28 |
| | | | | 348/294 |
| 2014/0240573 | A1* | 8/2014 | Penn | H04N 5/23293 |
| | | | | 348/333.1 |
| 2015/0022783 | A1* | 1/2015 | Lee | G06F 3/1423 |
| | | | | 353/20 |

* cited by examiner

through splitting at the beam splitter. This configuration enables measurement on the basis of a projected image of the subject displayed on the screen and a picked-up image of the subject. That is, while the optical measurement apparatus has its own function, the function of an image measurement apparatus performing measurement on the basis of the picked-up image of the subject can be added. Thus, the measurement accuracy and measurement workability can be improved.

IMAGE PICKUP APPARATUS, OPTICAL MEASUREMENT APPARATUS, AND MEASUREMENT SYSTEM

TECHNICAL FIELD

The present disclosure relates to an optical measurement apparatus projecting an image of a subject on a screen.

BACKGROUND ART

Patent Document 1 discloses an optical measuring machine including a screen and first and second image-forming units forming an optical image of a target object on the screen. The first image-forming unit takes a digital image of the target object and projects an optical image of the target object on the screen on the basis of the image data. The second image-forming unit forms an optical image of illuminating light radiated to and reflected off the target object, on the screen. The first and second image-forming units are switchable when necessary by switching between the position of an image pickup of the first image-forming unit and the position of a projection lens of the second image-forming unit (see paragraphs [0029] to [0033] and [0062] of the specification, FIG. 2, and the like of Patent Document 1).

CITATION LIST

Patent Literature

Patent Document 1: JP 2008-261721 A

SUMMARY

Technical Problem

Such an optical measurement apparatus requires a technique to improve measurement accuracy and measurement workability.

In light of the foregoing, an object is to provide an image pickup apparatus capable of improving measurement accuracy and measurement workability of an optical measurement apparatus, an optical measurement apparatus including the image pickup apparatus, and a measurement system.

Solution to Problem

To achieve the above-described object, an image pickup apparatus according to an embodiment includes a base section, a beam splitter, and an image pickup section.

The base section is configured to be detachably attached to an optical measurement apparatus including a projection optical system configured to project an image of a subject on a screen.

The beam splitter is disposed on an optical axis of the projection optical system upon attachment of the base section to the optical measurement apparatus.

The image pickup section includes an image pickup device configured to receive light generated through splitting at the beam splitter and is configured to take an image of the subject upon attachment of the base section.

This image pickup apparatus includes the base section detachably attached to the optical measurement apparatus. When the base section is attached to the optical measurement apparatus, the beam splitter is disposed on the optical axis of the projection optical system, and an image of the subject can be taken on the basis of the light generated The base section may be configured to be attached to a holding mechanism of the optical measurement apparatus, the holding mechanism being configured to detachably hold a lens unit holding a projection lens system of the projection optical system.

The image pickup apparatus having this configuration can be readily used as an add-on to, for example, an existing optical measurement apparatus. Thus, the function of the image measurement apparatus can be added to the optical measurement apparatus at relatively low cost.

The image pickup apparatus may further include a lens section configured to function as the projection lens system of the projection optical system upon attachment of the base section.

The image pickup apparatus having this configuration can be used instead of, for example, an existing lens unit. Thus, the function of the image measurement apparatus can be readily added to the optical measurement apparatus.

The base section may be configured to be detachably attached to a lens unit holding a projection lens system of the projection optical system.

The image pickup apparatus having this configuration can be readily used as an add-on to, for example, an existing lens unit. Thus, the function of the image measurement apparatus can be added to the optical measurement apparatus at relatively low cost.

The image pickup apparatus may further include an illuminator section configured to radiate light to the subject upon attachment of the base section.

By attaching the image pickup apparatus having this configuration, the subject can be illuminated.

The beam splitter may be a first beam splitter, and the image pickup section may include an optical system configured to guide light generated through splitting at the first beam splitter to the image pickup device. In this case, the illuminator section may include a light source section and a second beam splitter disposed on an optical axis of the optical system and configured to split light emitted from the light source section and to emit the light along the optical axis of the optical system to the first beam splitter.

This configuration enables coaxial epi-illumination.

The illuminator section may include a ring illuminator disposed around the optical axis of the projection optical system upon attachment of the base section.

This configuration enables efficient radiation of illuminating light to the subject.

The image pickup section may include an image pickup lens section configured to reduce or magnify light generated through splitting at the beam splitter and to guide the light to the image pickup device.

This configuration enables an image of the subject to be taken accurately.

The lens section may be configured to magnify an image of the subject with a predetermined magnification upon attachment of the base section. In this case, the image pickup lens section may be configured to reduce light generated through splitting at the beam splitter with a magnification corresponding to the predetermined magnification and to guide the light to the image pickup device.

This configuration enables an image of the subject to be taken accurately.

An optical measurement apparatus according to an embodiment includes a screen, a projection optical system, a beam splitter, and an image pickup section.

The projection optical system is configured to project an image of a subject on the screen.

The beam splitter is disposed on an optical axis of the projection optical system.

The image pickup section includes an image pickup device configured to receive light generated through splitting at the beam splitter and is configured to take an image of the subject.

This configuration enables measurement on the basis of a projected image of the subject displayed on the screen and a picked-up image of the subject. Thus, the measurement accuracy and measurement workability can be improved.

A measurement system according to an embodiment includes a measurement section and a measurement processing section.

The measurement section includes the screen, the projection optical system, the beam splitter, and the image pickup section.

The measurement processing section is configured to perform measurement processing on the subject on a basis of image pickup data acquired by the image pickup section.

This configuration enables measurement on the basis of a projected image of the subject displayed on the screen and a picked-up image of the subject. Thus, the measurement accuracy and measurement workability can be improved.

The measurement system may further include a display section configured to display an image of the subject on a basis of the image pickup data acquired by the image pickup section.

Advantageous Effects

As described above, the measurement accuracy and measurement workability of the optical measurement apparatus can be improved. Note that the above-described effects are not limited, and any of the effects described in the present disclosure may be exhibited.

DESCRIPTION OF EMBODIMENTS

Embodiments will be described below with reference to the accompanying drawings.

Configuration of Measurement System

Figure 1:
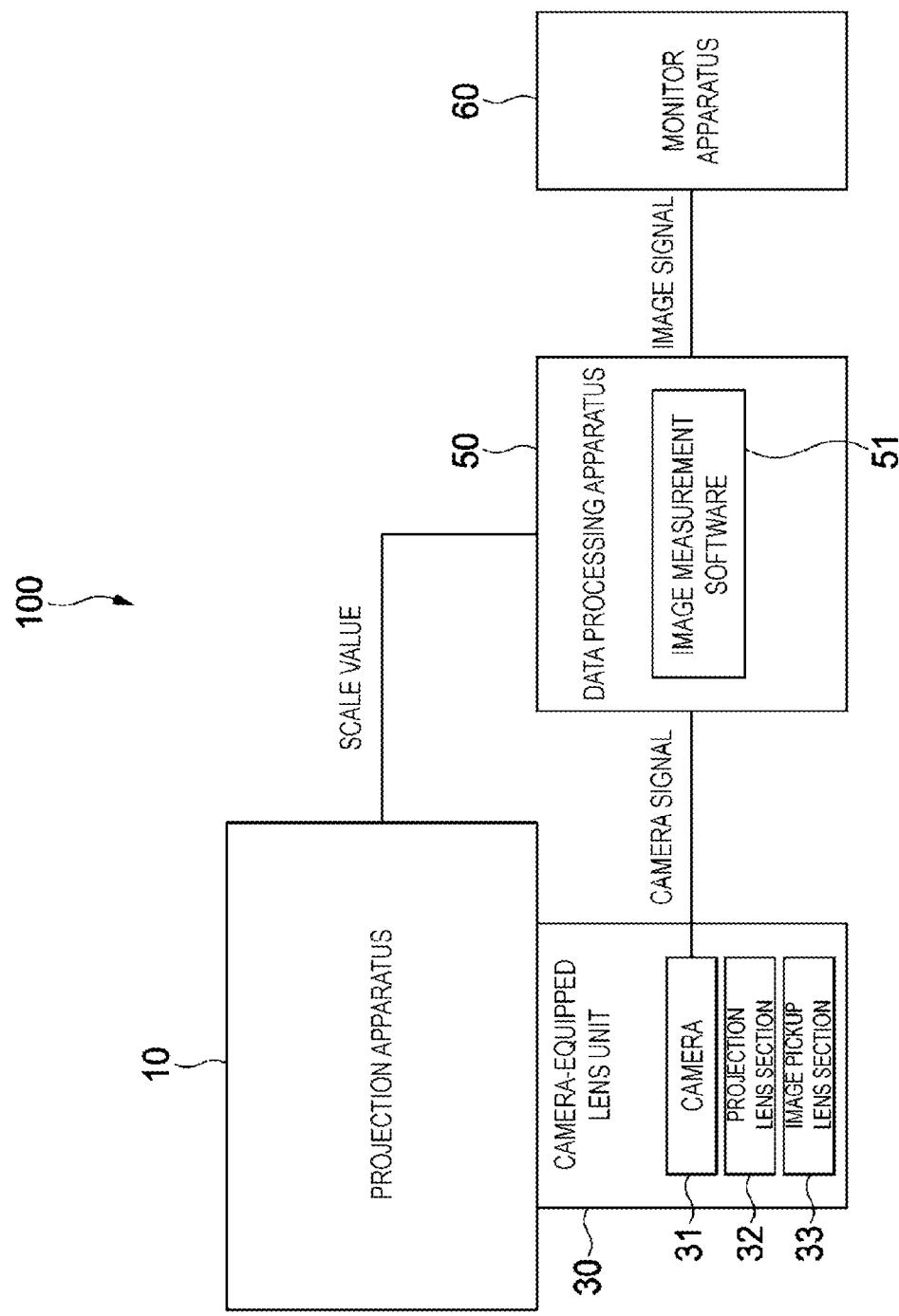
FIG. 1 is a schematic block diagram of an example configuration of a measurement system according to an embodiment.

FIG. 1 is a schematic block diagram of an example configuration of a measurement system according to an embodiment. The measurement system 100 includes a projection apparatus 10, a data processing apparatus 50, and a monitor apparatus 60.

The projection apparatus 10 and the data processing apparatus 50 are connected in a mutually communicable manner. The monitor apparatus 60 is connected with the data processing apparatus 50. A configuration for connection of these apparatuses is not limited, and a desired wired or wireless connection method may be used. For example, a desired interface, cable, network module, near field wireless communication module, or the like may be used.

Figure 2:
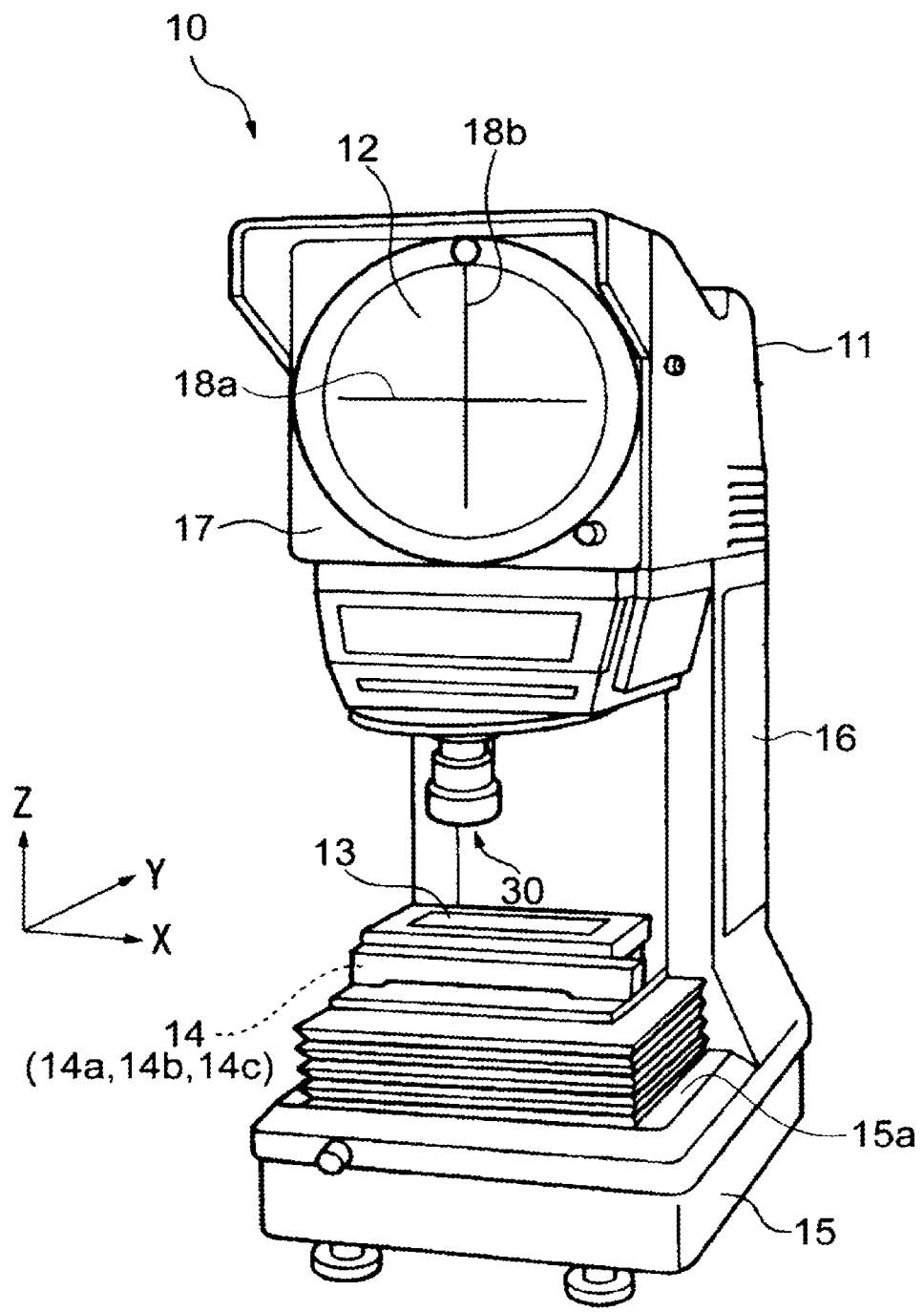
FIG. 2 is a schematic external perspective view of a projection apparatus.

The projection apparatus 10 can radiate illuminating light to a workpiece (subject) and form and project an image of the workpiece on a screen 12 (see FIG. 2). Thus, a projected image of the workpiece is displayed on the screen 12.

As illustrated in FIG. 1, the projection apparatus 10 includes a camera-equipped lens unit (hereinafter referred to as lens unit) 30. The lens unit 30 can be attached to and detached from the projection apparatus 10, and includes a camera 31, a projection lens section 32, and an image pickup lens section 33.

In this embodiment, the projection apparatus 10 corresponds to an optical measurement apparatus. The lens unit 30 corresponds to an image pickup apparatus. The projection apparatus 10 and the lens unit 30 will be described in detail later.

The data processing apparatus 50 includes hardware (circuitry), such as a GPU, CPU, ROM, RAM, and HDD, necessary for a configuration of a computer. The CPU loads a program preliminarily stored in the ROM or the like into the RAM and executes the program to execute image measurement software 51. The data processing apparatus 50 can be realized by, for example, a desired computer, such as a personal computer (PC).

As illustrated in FIG. 1, the projection apparatus 10 sends a scale value and a camera signal to the data processing apparatus 50. The scale value indicates position information on a stage 13 (see FIG. 2) on which the workpiece is placed, and will be described in detail later. The camera signal contains image pickup data on the workpiece of which an image is taken by the camera 31.

The image measurement software 51 performs various pieces of measurement processing on the basis of the scale value (position information) and the camera signal (image pickup data) sent from the projection apparatus 10. Desired measurement processing, such as edge detection, dimension measurement, angle measurement, roundness measurement, and shape measurement, can be performed. Note that information other than the position information and the image pickup data may be sent from the projection apparatus 10 to the data processing apparatus 50 and used for measurement processing.

The image measurement software 51 generates a measurement graphical user interface (GUI) 61 (see FIG. 9) containing the scale value, a picked-up image of the workpiece, and the like. The image signal of the generated measurement GUI 61 is sent to the monitor apparatus 60.

The monitor apparatus 60 is a display device using, for example, a liquid crystal, electro-luminescence (EL), or the like. The monitor apparatus 60 displays the measurement GUI 61 on the basis of the image signal sent from the data processing apparatus 50. It is to be understood that other images can be di splayed.

Projection Apparatus

FIG. 2 is a schematic external perspective view of the projection apparatus 10. The projection apparatus 10 includes a main body 11, the screen 12, the stage 13, a movement mechanism 14, and the lens unit 30. Note that in FIG. 2, the lens unit 30 is simplified.

The main body 11 includes a base section 15, a support portion 16, and a head portion 17. The base section 15 is placed on a desk, a workbench, or the like, and has a top surface 15a. The support portion 16 is disposed at a rear end of the base section 15 and extends in the height direction. The head portion 17 is disposed at an upper portion of the support portion 16.

The screen 12 is disposed on a front surface of the head portion 17 and has two reference lines 18a and 18b used for visual measurement of the workpiece. The two reference lines 18a and 18b are orthogonal to each other at the center of the circular screen 12.

The stage 13 is disposed on the top surface 15a of the base section 15 and can move in X, Y, and Z directions orthogonal to each other. In the example illustrated in FIG. 2, the movement mechanism 14 is configured on the top surface 15a of the base section 15 and supports the stage 13 in such a manner that the stage 13 can move in the X, Y, and Z directions.

Note that in this embodiment, such a coordinate system is determined that the X direction, Y direction, and Z direction extend respectively in the lateral direction, front-rear direction, and vertical direction of the projection apparatus 10. The lateral direction along the reference line 18a of the screen 12 corresponds to the X direction, and the vertical direction along the reference line 18b corresponds to the Y direction.

The movement mechanism 14 includes three linear encoders 14a to 14c detecting amounts of movement in the X, Y, and Z directions. The linear encoders 14a to 14c calculate the scale values in the X, Y, and Z directions, and the scale values are sent to the data processing apparatus 50. The movement mechanism 14 also includes an operation section (not illustrated) receiving a movement operation performed by a user and can move the stage 13 in the X, Y, and Z directions in accordance with the amount of the operation input. The configuration of the movement mechanism 14 is not limited, and a desired configuration may be used.

Figure 3:
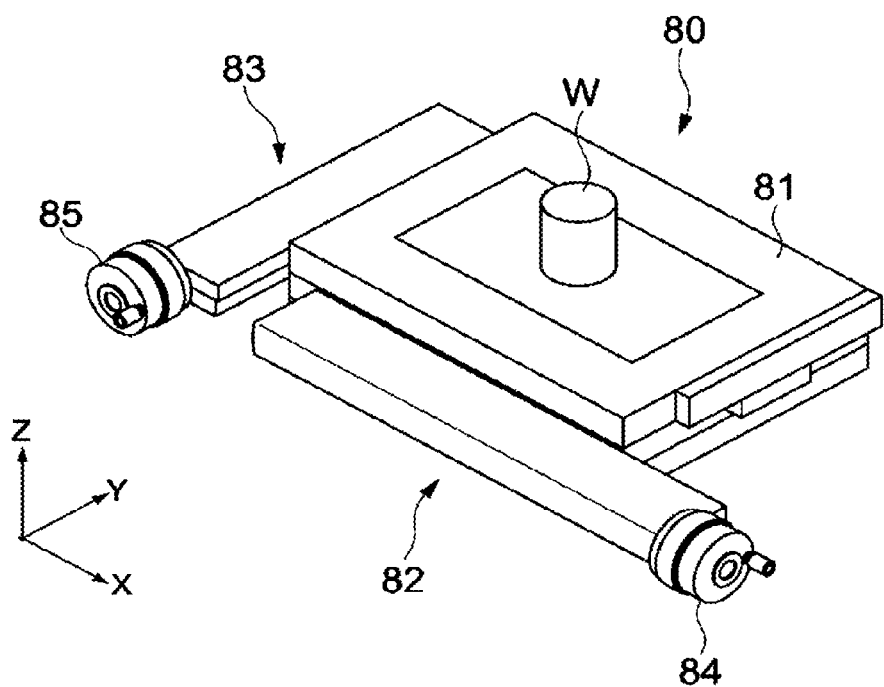
FIG. 3 is a schematic perspective view of an example configuration of a stage unit.

FIG. 3 is a schematic perspective view of an example configuration of a stage unit. The stage unit 80 includes a stage 81 on which the workpiece W is placed, an X-axis stage 82, and a Y-axis stage 83. The X-axis stage 82 supports the stage 81 in such a manner that the stage 81 can move in the X direction. The Y-axis stage 83 supports the stage 81 in such a manner that the stage 81 can move in the Y direction.

The X-axis stage 82 includes an X-axis handle 84 and an X-axis linear encoder (not illustrated). The Y-axis stage 83 includes a Y-axis handle 85 and a Y-axis linear encoder (not illustrated). The user turns the X-axis handle 84 and the Y-axis handle 85 to move the stage 81. The X-axis handle 84 and the Y-axis handle 85 function as the above-described operation section.

The X-axis linear encoder and the Y-axis linear encoder output the scale values corresponding to movement of the stage 81. In specific, X and Y coordinate values are output with a predetermined position determined as a reference (origin). The user can determine the predetermined position being the reference, and can determine, for example, a desired position as the origin (0,0) (zero setting).

For example, the stage unit 80 illustrated in FIG. 3 may be disposed on the top surface 15a of the base section 15 and used as the stage 13 and the movement mechanism 14. Regarding movement in the Z direction, a Z-axis handle (not illustrated) may be turned to move the head portion 17 in the vertical direction.

Figure 4:
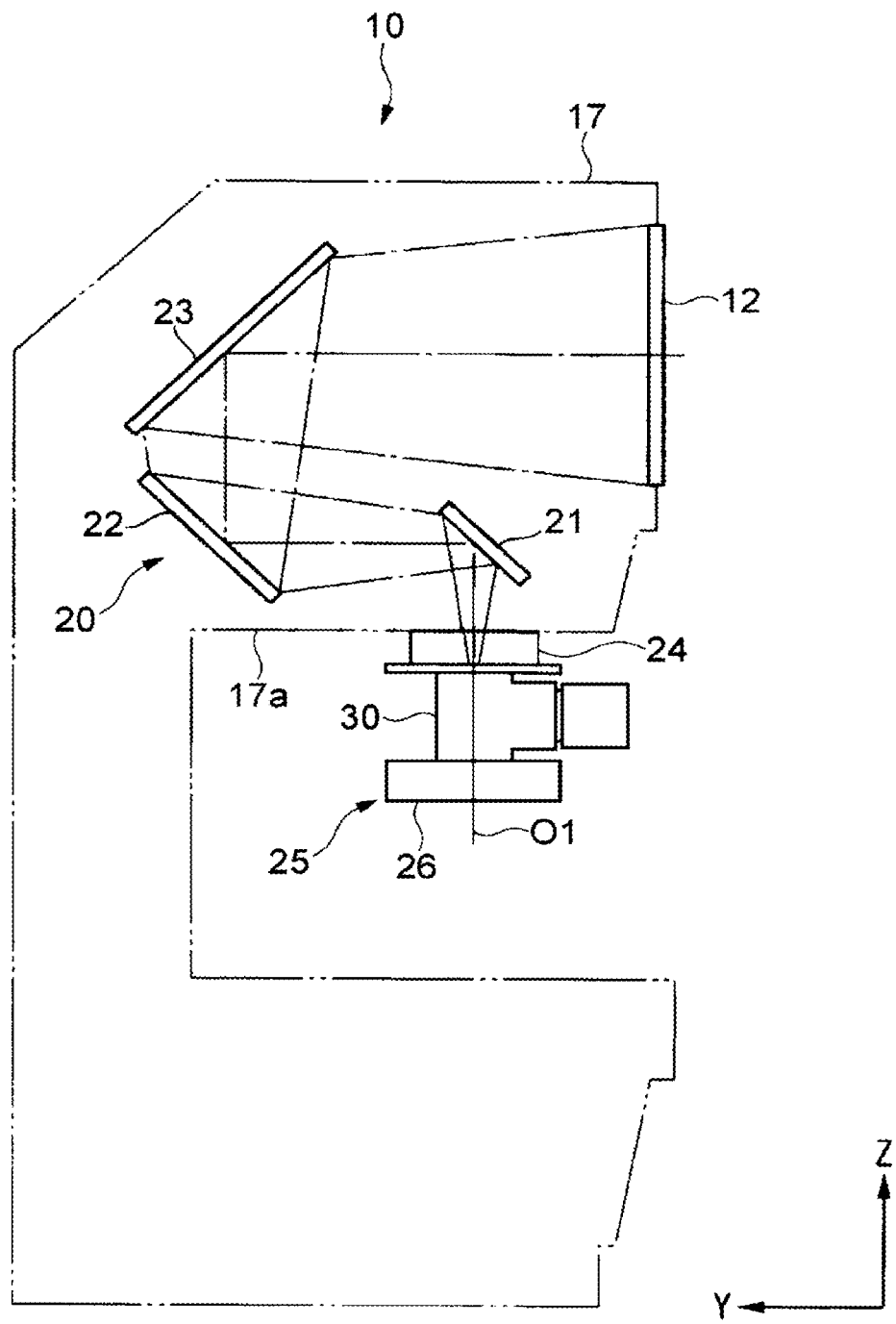
FIG. 4 is a schematic view of an example configuration of a projection optical system of the projection apparatus.

FIG. 4 is a schematic view of an example configuration of a projection optical system (or optical projection system) of the projection apparatus 10. The projection optical system 20 projects an image of the workpiece on the screen 12 and includes a projection lens system and reflecting mirrors 21 to 23. In this embodiment, the projection lens section 32 of the lens unit 30 functions as the projection lens system of the projection optical system 20. As illustrated in FIG. 4, the illuminating light reflected off the workpiece is guided along an optical axis O1 of the projection optical system 20 to the screen 12.

In specific, the projection lens section 32 (projection lens system) of the lens unit 30 magnifies the image of the workpiece. The magnified image of the workpiece is sequentially reflected off the reflecting mirrors 21 to 23 and projected on the screen 12 from the rear side in the Y direction. The projection optical system 20 may have any configuration designed in a desired manner. For example, another optical member may be disposed in the head portion 17.

A ring illuminator section 25 radiating illuminating light to the workpiece is attached to a lower portion of the lens unit 30. The ring illuminator section 25 includes a ring illuminator 26 disposed around the optical axis O1 of the projection optical system 20 when the lens unit 30 is attached. The illumination operation, amount of light, and the like of the ring illuminator 26 can be controlled by the data processing apparatus 50.

As illustrated in FIG. 4, a unit holding section 24 is disposed on a bottom surface 17a of the head portion 17. The lens unit 30 is attached to and held by the unit holding section 24. A specific configuration for holding the lens unit 30 is not limited and may be designed in a desired manner.

Figure 5:
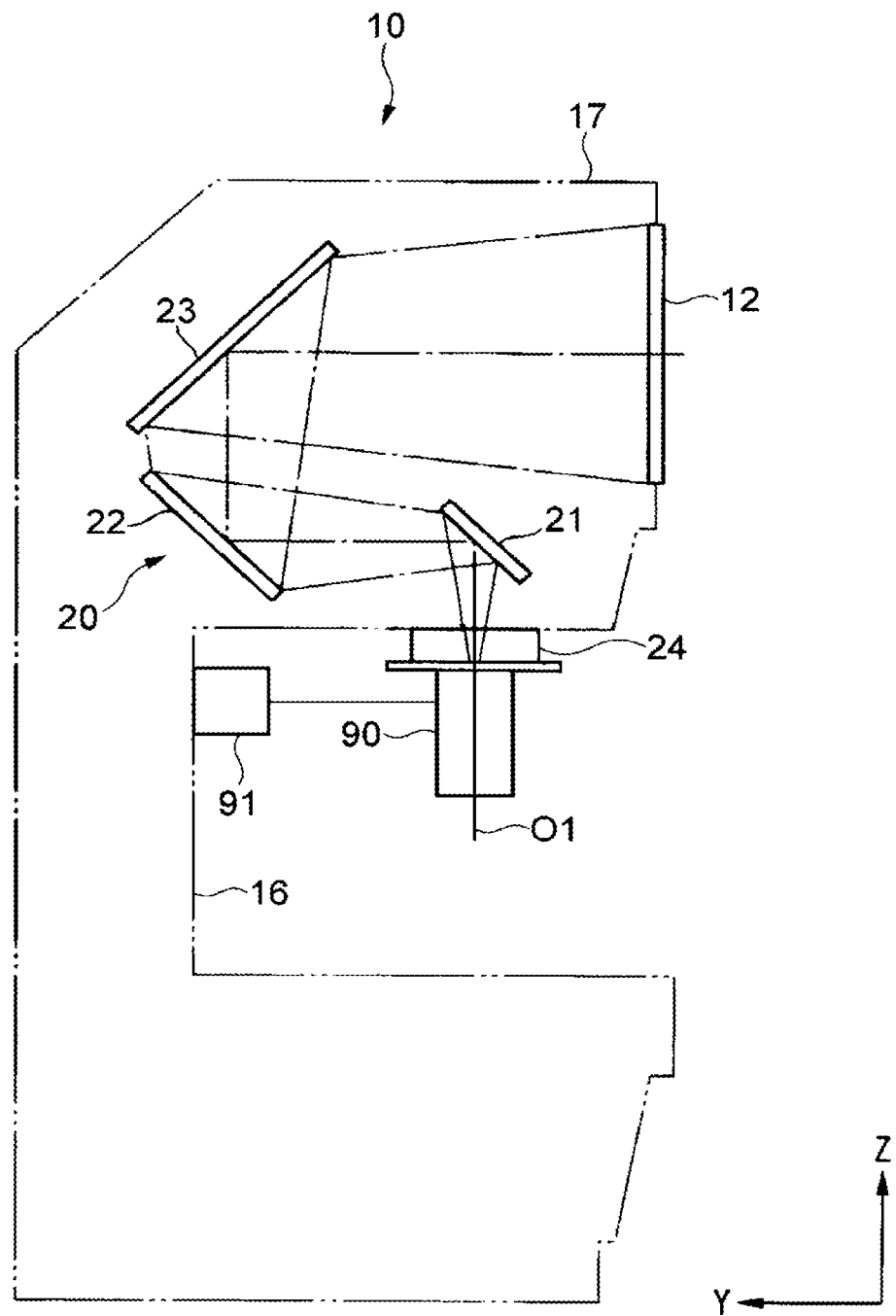
FIG. 5 is a schematic view illustrating the case in which a lens unit with no camera equipped is attached.

FIG. 5 is a schematic view illustrating the case in which a lens unit 90 with no camera equipped is attached to the unit holding section 24. The lens unit 90 holds the projection lens system of the projection optical system 20 and can be attached to and detached from the unit holding section 24. In other words, the projection lens section (not illustrated) functioning as the projection lens system of the projection optical system 20 when attached to the unit holding section 24 is disposed in the lens unit 90.

The ring illuminator section 25 illustrated in FIG. 4 may be attached to the lens unit 90. Alternatively, as illustrated in FIG. 5, a light source 91 disposed on the front surface side of the support portion 16 and a half mirror (not illustrated) disposed in the lens unit 90 may enable coaxial epi-illumination.

In this embodiment, the lens unit 90 with no camera equipped is attached to the unit holding section 24 when necessary depending on the magnification or the like of the projection lens section disposed inside. The lens unit 30 of this embodiment is configured to be attached to and detached from the unit holding section 24. In other words, the lens unit 30 is configured to be used as an add-on to an existing projection apparatus 10. The unit holding section 24 corresponds to a holding mechanism of the projection apparatus 10.

Lens Unit

Figure 6:
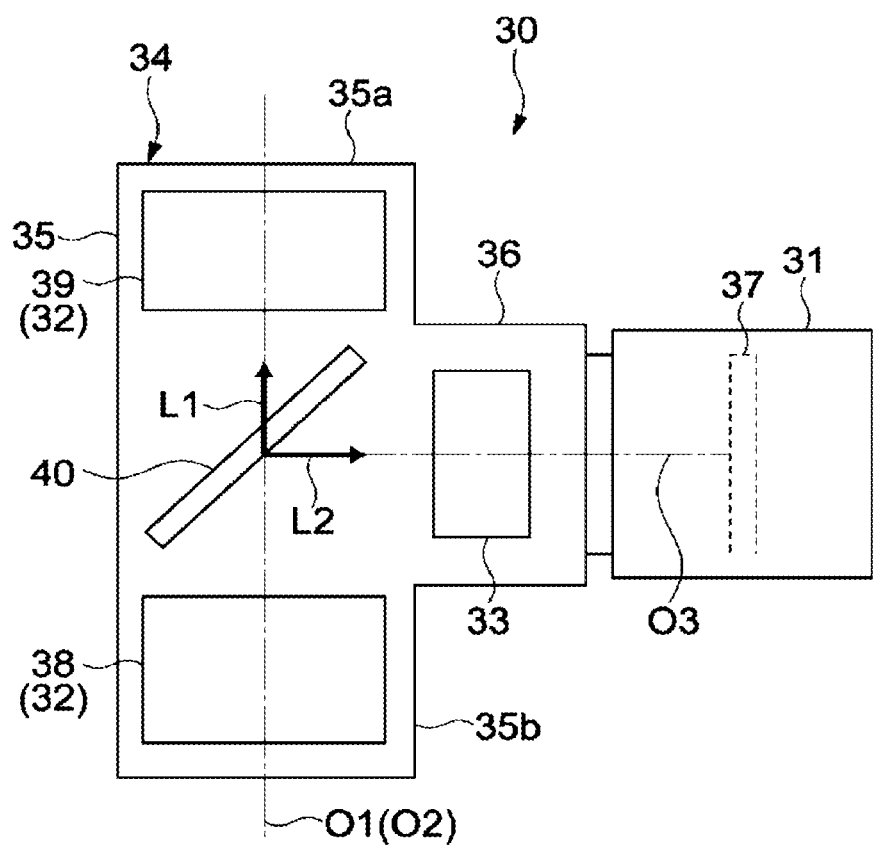
FIG. 6 is a schematic view of an example configuration of a lens unit.

FIG. 6 is a schematic view of an example configuration of the lens unit 30. The lens unit 30 includes a lens holding section 34 and the camera 31 connected with the lens holding section 34.

The lens holding section 34 includes a main body portion 35 having a substantially cylindrical shape and extending in one direction and a connection portion 36 formed on a side surface of the main body portion 35. The connection portion 36 also has a substantially cylindrical shape and is coupled to the side surface of the main body portion 35 while extending in a direction substantially orthogonal to the extending direction of the main body portion 35. As illustrated in FIG. 6, the lens holding section 34 has a T shape lying on its side as a whole.

The main body portion 35 has one end portion 35a on the upper side attached to the unit holding section 24 illustrated in FIGS. 4 and 5. The main body portion 35 has the other end portion 35b on the lower side to which the ring illuminator section 25 is attached. In this embodiment, the lens holding section 34 corresponds to a base section.

The camera 31 is connected with the connection portion 36 of the lens holding section 34 in a direction substantially orthogonal to the extending direction of the main body portion 35 while facing the interior of the main body portion 35. As schematically illustrated in FIG. 6, the camera 31 includes an image pickup device 37. Examples of the image pickup device 37 include complementary metal oxide semiconductor (CMOS) and charge coupled device (CCD) sensors. In this embodiment, the camera 31 corresponds to an image pickup section (image pickup circuitry).

As illustrated in FIG. 6, a first projection lens group 38, a second projection lens group 39, a beam splitter 40, and the image pickup lens section (image pickup lens group) 33 are disposed in the lens holding section 34. The first projection lens group 38 includes a plurality of lenses and is disposed in the lower end portion 35b of the main body portion 35. The second projection lens group 39 includes a plurality of lenses and is disposed in the upper end portion 35a of the main body portion 35.

The first and second projection lens groups 38 and 39 constitute the projection lens section 32 functioning as the projection lens system of the projection optical system 20. The first and second projection lens groups 38 and 39 have an optical axis O2 substantially parallel with the extending direction of the main body portion 35. The lens unit 30 is attached to the unit holding section 24 so that the optical axis O2 of the first and second projection lens groups 38 and 39 (i.e., the projection lens section 32) coincides with the optical axis O1 of the projection optical system 20.

The first and second projection lens groups 38 and 39 can magnify light incident along the optical axis O2 (O1) with a predetermined magnification and form an image on the screen 12. The predetermined magnification is not limited and may be a desired magnification, for example, a magnification of 10, 20, 50, 100, or the like. Note that the configuration is not limited to that of the projection lens section 32, and, for example, a single lens instead of the plural lenses may be disposed in a position of each of the first and second projection lens groups 38 and 39.

The beam splitter 40 is disposed between the first and second projection lens groups 38 and 39 and on the optical axis O2. In other words, the beam splitter 40 is disposed on the optical axis O1 of the projection optical system 20.

The beam splitter 40 transmits one portion of light passing through the first projection lens group 38 as a first split beam L1 and emits the first split beam L1 along the optical axis O2 toward the second projection lens group 39. The beam splitter 40 reflects another portion of the light passing through the first projection lens group 38 as a second split beam L2 and emits the second split beam L2 toward the camera 31 connected with the connection portion 36.

The beam splitter 40 is composed of, for example, a half mirror. Alternatively, a beam splitting element capable of controlling the amount of each of the first and second split beams L1 and L2 may be used. Alternatively, a dichroic mirror or the like capable of splitting into the first and second split beams L1 and L2 in accordance with the wavelength range may be used. For example, such control can be exercised that the color component of the projected image of the workpiece displayed on the screen 12 differs from the color component of the picked-up image of the workpiece taken by the camera 31.

The image pickup lens section 33 is disposed between the camera 31 and the beam splitter 40 in the connection portion 36 of the lens holding section 34. The image pickup lens section 33 guides the second split beam L2 generated through splitting at the beam splitter 40 to the image pickup device 37 of the camera 31. That is, the image pickup lens section 33 reduces the second split beam L2 with a magnification corresponding to the magnifying power of the projection lens section 32 and forms an image of the workpiece on the image pickup device 37. The magnification (reduction ratio) of the image pickup lens section 33 is determined such that an image of the workpiece is appropriately formed on the image pickup device 37.

Note that the disclosure is not limited to the case in which the image pickup lens section 33 reduces the second split beam L2. Depending on the measurement application, the configuration of the optical system, or the like, the second split beam L2 may be magnified by the image pickup lens section 33 and guided to the image pickup device 37.

For example, a projection lens section 32 of high magnification provides a narrower field of view for projection. An image of the field of view formed with the second split beam L2 generated through splitting at the beam splitter 40 may be smaller than the effective area of the image pickup device 37. In this case, the image pickup lens section 33 magnifies the second split beam L2.

The projection lens section 32 of high magnification provides a narrower field of view for projection but better resolution of a projected image. Thus, if high resolution is required for measurement in which a projected image of the screen 12 is locally taken, for example, it is effective to magnify the field of view smaller than the area capable of being taken by the image pickup device 37 with a high magnification and project the image.

In this embodiment, the first projection lens group 38, the beam splitter 40, and the image pickup lens section 33 constitute an image pickup optical system. The second split beam L2 travels along an optical axis O3 of the image pickup optical system and is incident on the image pickup device 37. Thus, the camera 31 can take an image of the workpiece. The image pickup lens section 33 may have any configuration and is provided with at least one lens. For example, the image pickup lens section 33 may be designed appropriately to match the design of the first projection lens group 38. The image pickup optical system may also have any configuration, and a desired optical path of the second split beam L2 may be designed.

Figure 7:
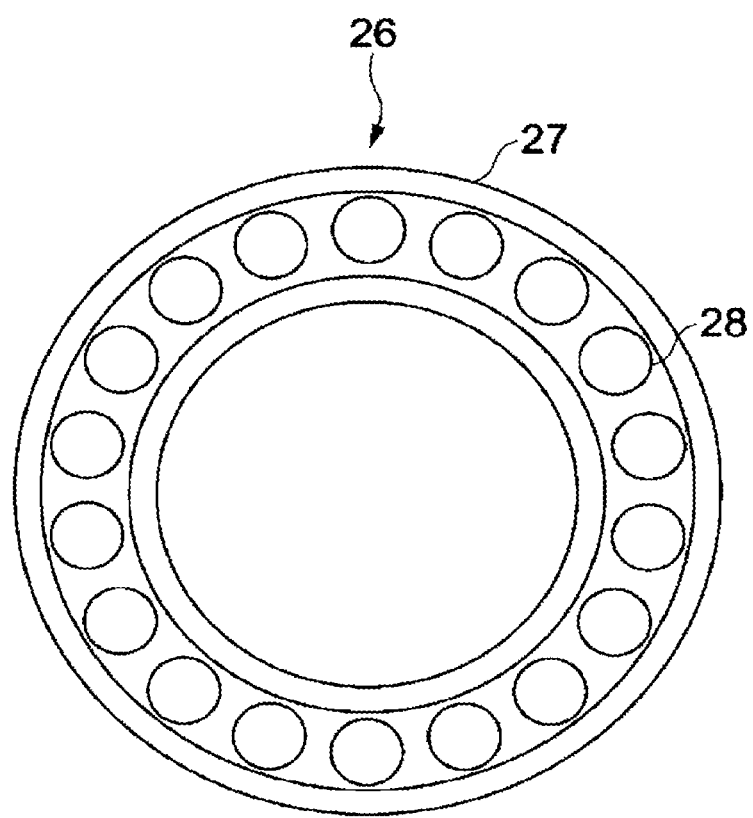
FIG. 7 is a schematic bottom view of an example configuration of a ring illuminator section.

FIG. 7 is a schematic bottom view of an example configuration of the ring illuminator 26. The ring illuminator 26 includes a ring-shaped main body portion 27 and a plurality of light sources 28 disposed on the main body portion 27. The ring illuminator 26 is attached to the lens unit 30 so that the main body portion 27 surrounds the lower end portion 35b of the lens unit 30. The light sources 28 are composed of, for example, light emitting diodes (LED); however, no such limitation is intended. The number of the light sources 28 and the wavelength of emitted light are not limited, and a desired design may be used.

In this embodiment, the lens holding section 34, the beam splitter 40, and the camera 31 are integrally configured as the lens unit 30 that can be detachably attached to the projection apparatus 10. This configuration facilitates positioning of the beam splitter 40 and the camera 31 and the like, and allows the beam splitter 40 to be readily disposed on the optical axis O1 of the projection optical system 20. The integrated configuration eliminates the need of camera adjustment and the like in measuring the workpiece and thus exhibits excellent usability and high measurement workability.

Since the lens unit 30 of this embodiment can be used as an add-on, no additional mechanism for equipping the beam splitter 40, the image pickup lens section 33, and the camera 31 is required to be prepared, resulting in cost reduction.

It is to be understood that a plurality of lens units 30 can be prepared for projection lens sections 32 of different magnifications, and that by using an appropriate one of the lens units 30, a projected image magnified with a desired magnification can be projected on the screen 12. A picked-up image of the workpiece at that time can be acquired simultaneously. That is, the lens unit 30 can be used instead of the existing lens unit 90.

In this embodiment, the ring illuminator section 25 is also integrated with the lens holding section 34, so that illuminating light can be efficiently radiated to the workpiece only by attaching the lens unit 30. This configuration prevents the apparatus from being complex.

Measurement of Workpiece

Figure 8:
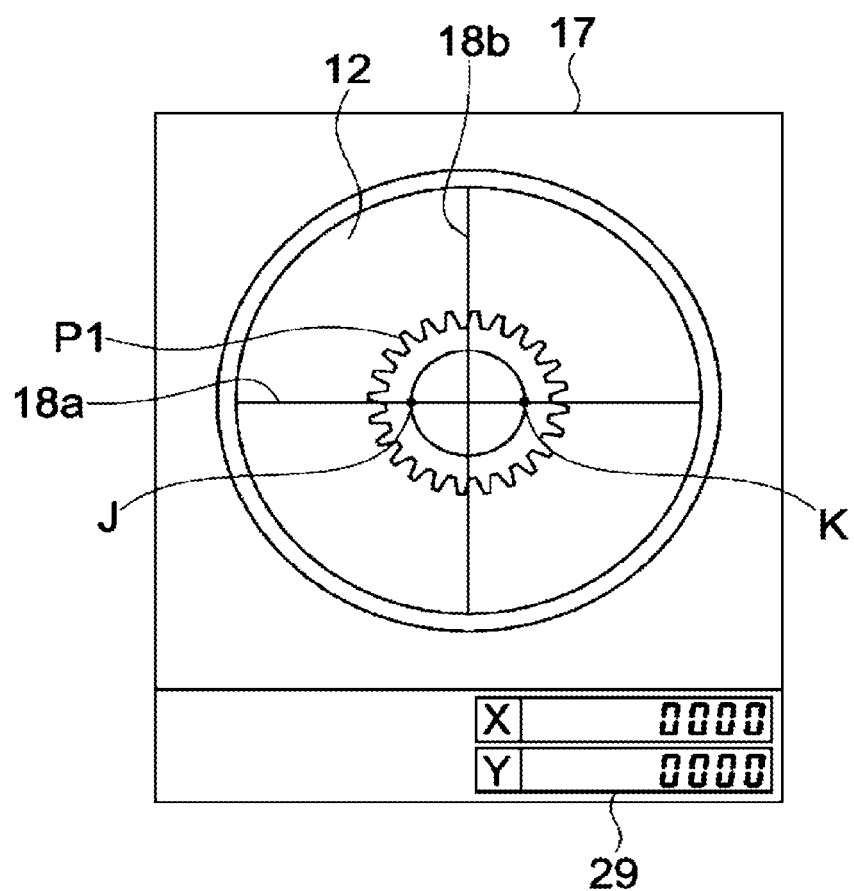
FIG. 8 is a front view of a head portion with a screen disposed thereon.
Figure 9:
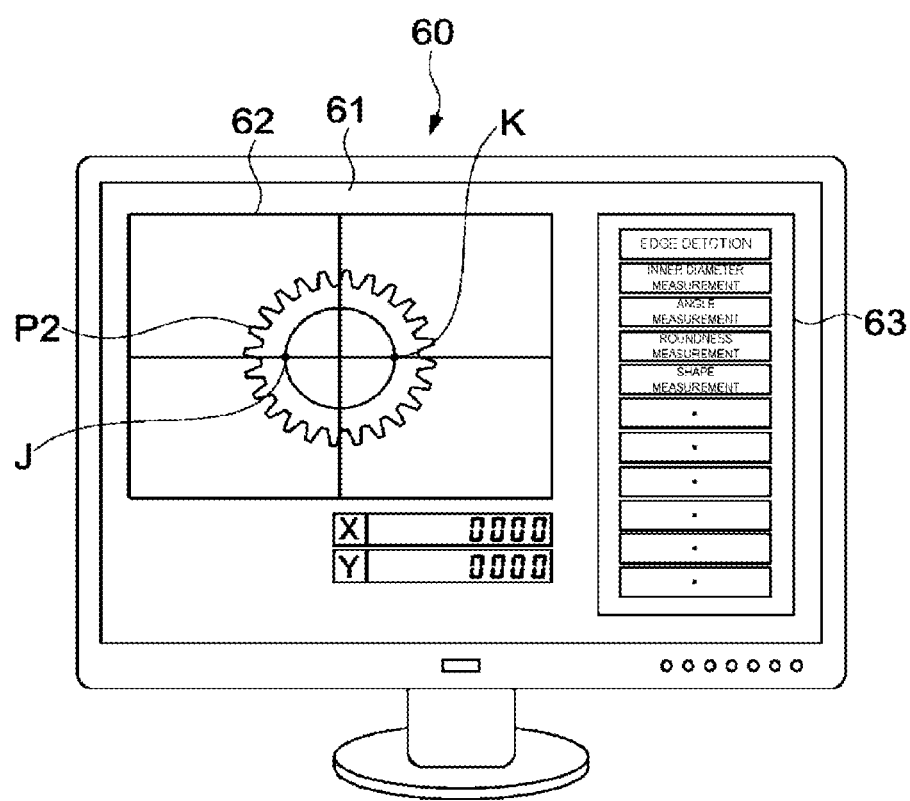
FIG. 9 is a schematic view of an example measurement GUI displayed on a monitor apparatus.

FIG. 8 is a front view of the head portion 17 with the screen 12 disposed thereon. FIG. 9 is a schematic view of an example of the measurement GUI 61 displayed on the monitor apparatus 60.

A workpiece is placed on the stage 13, and the ring illuminator section 25 is turned on. The ring illuminator section 25 emits illuminating light toward the workpiece, and reflected light thereof is incident on the lens unit 30.

The first split beam L1 passing through the first projection lens group 38, the beam splitter 40, and the second projection lens group 39 is magnified with a predetermined magnification and projected on the screen 12 of the head portion 17. Thus, a projected image P1 of the workpiece is displayed on the screen 12 as illustrated in FIG. 8.

The user operates the X-axis handle 84 and the Y-axis handle 85 illustrated in FIG. 3 to move the stage 13. This operation can move the projected image P1 displayed on the screen 12.

As illustrated in FIG. 8, a scale display section 29 is disposed below the screen 12. The scale display section 29 displays an X scale value (X coordinate value) and a Y scale value (Y coordinate value) corresponding to movement of the projected image P1 of the workpiece. These scale values are used to perform various types of measurement.

For example, the stage 13 is moved to position a point J of the projected image P1 illustrated in FIG. 8 on the reference line 18b of the screen 12. The X and Y scale values are subjected to zero setting. The stage 13 is moved in the X direction to position a point K of the projected image P1 on the reference line 18b. By reading the X scale value at that time, the inner diameter of the workpiece in the X direction can be measured.

The second split beam L2 passing through the first projection lens group 38, the beam splitter 40, and the image pickup lens section 33 in the light incident on the lens unit 30 is received by the image pickup device 37 of the camera 31. Thus, an image of the workpiece is taken to generate image pickup data of the workpiece.

The image pickup data is sent to the data processing apparatus 50, and the measurement GUI 61 is generated. The generated measurement GUI 61 is displayed on the monitor apparatus 60. As illustrated in FIG. 9, the displayed measurement GUI 61 contains, for example, a measurement window 62 corresponding to the screen 12 of the head portion 17, the X and Y scale values, and an execution window 63 for executing various types of measurement. Note that a specific configuration of the measurement GUI 61 is not limited and may be designed in a desired manner.

By moving the stage 13 by the user, a picked-up image P2 of the workpiece in the measurement window 62 is moved, and the X and Y scale values are updated. The position of the picked-up image P2 and the X and Y scale values correspond to the position of the projected image P1 displayed on the screen 12 and the X and Y scale values displayed on the scale display section 29, respectively. It is to be understood that no such limitation is intended, and movement of the picked-up image P2 and update of the X and Y scale values may be performed with reference to a different reference position.

For example, the user positions the center of the picked-up image P2 of the workpiece in the vicinity of the center of the measurement window 62. Then, the execution window 63 is appropriately operated to automatically execute various types of measurement by the image measurement software 51. For example, the inner diameter from the point J to the point K in the X direction can be readily measured.

The image measurement software 51 performs automatic measurement, so that even if the center of the picked-up image P2 is not positioned exactly at the center of the measurement window 62, for example, highly accurate measurement can be performed. Additionally, without moving the stage 13 at all, the inner diameter and the like can be measured on the basis of the picked-up image P2 of the workpiece. Thus, high measurement workability is exhibited.

Figure 10:
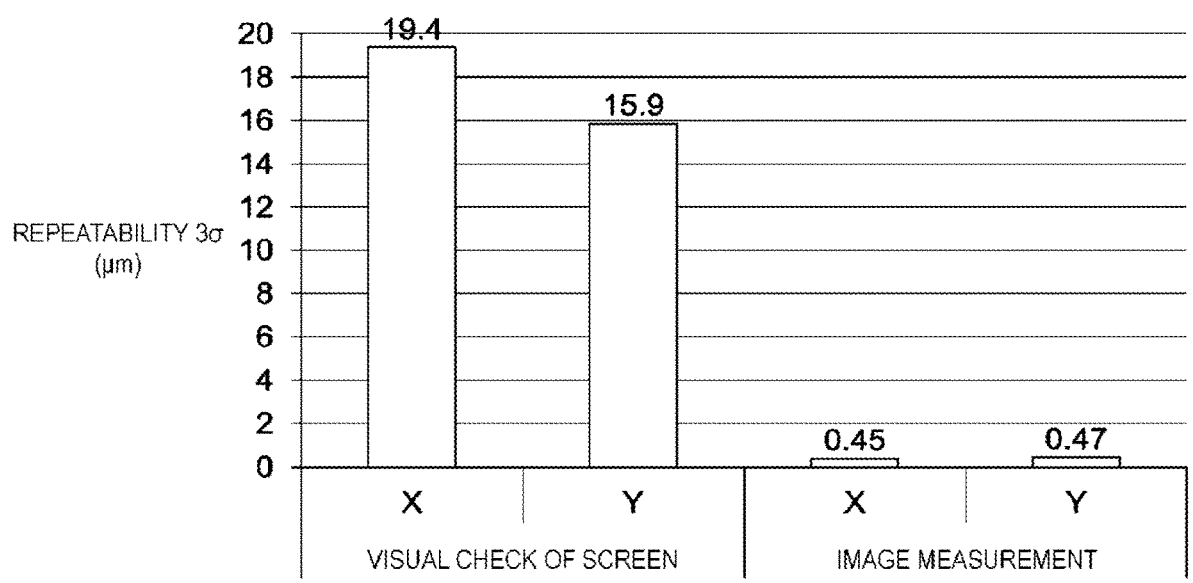
FIG. 10 is a graph for comparing accuracy in dimension measurement using a projected image with accuracy in dimension measurement by image measurement software 51 using the measurement GUI.

FIG. 10 is a graph for comparing accuracy in dimension measurement using the projected image P1 displayed on the screen 12 with accuracy in dimension measurement by the image measurement software 51 using the measurement GUI 61. Three measurers measured the dimensions of the same measurement subject in the X direction and the Y direction ten times. The mean of repeatability ($3\sigma$) of the three measurers was calculated for each of the X and Y directions, and a graph was prepared. As a result, measurement by the image measurement software 51 significantly reduced person-to-person variation in comparison with visual measurement. This indicates that measurement with the picked-up image P2 of the workpiece exhibited significantly high measurement accuracy.

Figure 11A:
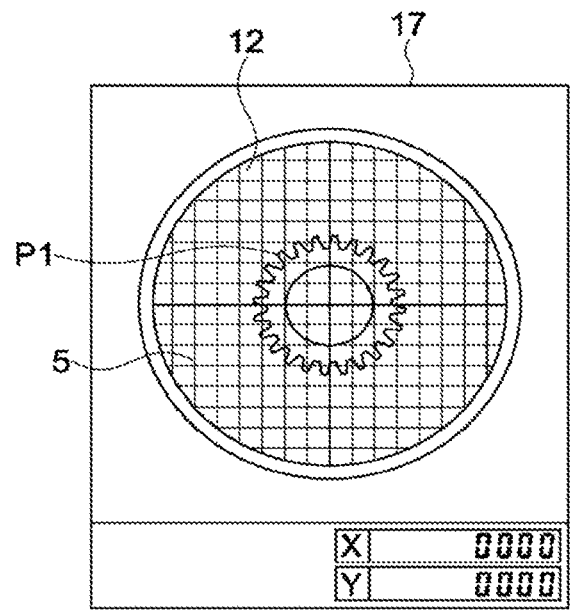
FIGS. 11A and 11B are schematic views for describing measurement using a reference chart.
Figure 11B:
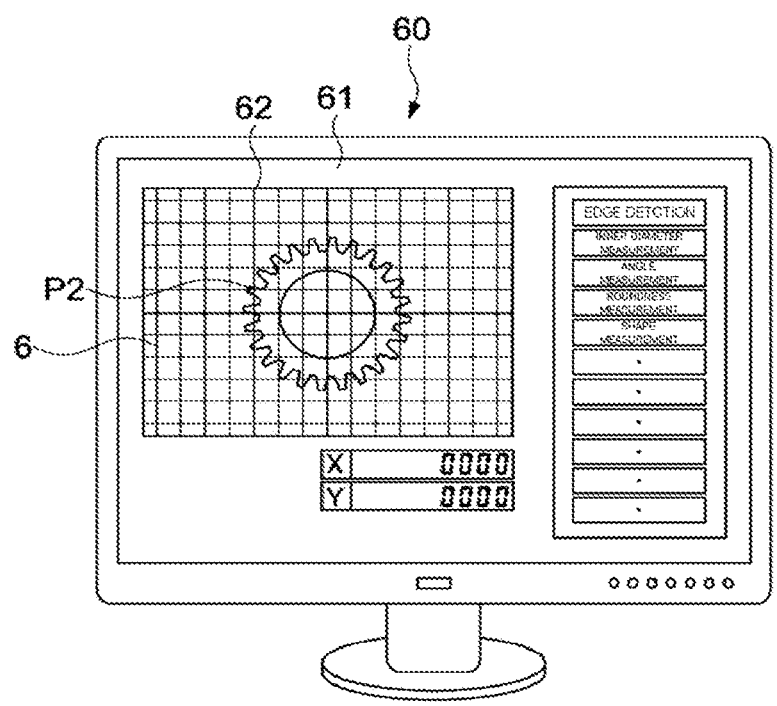

FIGS. 11A and 11B are schematic views for describing measurement using a reference chart. As illustrated in FIG. 11A, a reference chart 5 is attached to the screen 12 of the head portion 17. By comparing the projected image P1 of the workpiece with the reference chart 5, the dimension, angle, and the like of the workpiece can be measured. Additionally, it can be determined whether or not the dimension or the like of the workpiece is within tolerance. A plurality of types of reference charts 5 are prepared for measurement applications, and the user replaces the reference chart 5 with an appropriate one to be used.

In this embodiment, since the picked-up image P2 of the workpiece is generated, a desired reference chart image 6 can be displayed on the measurement window 62 of the measurement GUI 61 as illustrated in FIG. 11B. That is, the reference chart 5 is not required to be prepared actually. The reference chart image 6 can be displayed in a desired position to match the position of the picked-up image P2 of the workpiece, so that positioning of the stage 13 is not required. Thus, significantly high workability is exhibited.

Regarding measurement accuracy, similar to the graph in FIG. 10, significantly high measurement accuracy is exhibited in comparison with visual measurement. Operating the measurement GUI 61 enables ready change of the reference chart image 6. This eliminates labor to prepare the reference chart 5 to be attached next and to replace the reference chart 5, so that significantly high workability is exhibited.

As described above, the measurement system 100 according to this embodiment includes the lens holding section 34 with which the lens unit 30 equipped with the camera 31 is detachably attached to the projection apparatus 10. When the lens holding section 34 is attached to the projection apparatus 10, the beam splitter 40 is positioned on the optical axis O1 of the projection optical system 20, and an image of the workpiece is taken on the basis of the second split beam L2 generated through splitting at the beam splitter 40. This configuration enables observation of the projected image P1 of the workpiece displayed on the screen 12 and the picked-up image P2 of the workpiece at the same time. Measurement by the image measurement software 51 can also be performed on the basis of the picked-up image P2.

That is, while the projection apparatus 10 has its own function, the function of an image measurement apparatus performing measurement on the basis of the picked-up image P2 of the workpiece can be added. Thus, the measurement accuracy and measurement workability can be improved.

The lens unit 30 can be readily used as an add-on to an existing projection apparatus 10, so that the function of the image measurement apparatus can be added to the projection apparatus 10 at relatively low cost.

Let us consider the case in which an image of the projected image P1 displayed on the screen 12 is taken with a digital camera or the like to, for example, save a picked-up image of the workpiece. In this case, measurement environment (such as brightness in the room) readily affects the image taking, and it is difficult to ensure reproducibility of the camera position and the like. In other words, the image-taking environment and the camera position change each time the user takes an image, and it is difficult to save a picked-up image of the workpiece with high precision.

In this embodiment, the camera 31 equipped in the lens unit 30 can take an image of the workpiece in projecting an image of the workpiece. Thus, the picked-up image P2 of the workpiece can be acquired with high precision independently of the measurement environment. In other words, variation in image quality and the like of the picked-up image P2 due to variation in the measurement environment can be prevented, and an image can be taken stably.

Since the beam splitter 40 is disposed in the vicinity of the projection lens system magnifying an image of the workpiece, light before diffusion of the light beam be emitted as the second split beam L2 toward the image pickup optical system. Thus, the image pickup lens section 33 forming an image of the second split beam L2 on the image pickup device 37 can be reduced in size.

Other Embodiments

The invention is not limited to the above-described embodiment, and various other embodiments can be achieved.

Figure 12:
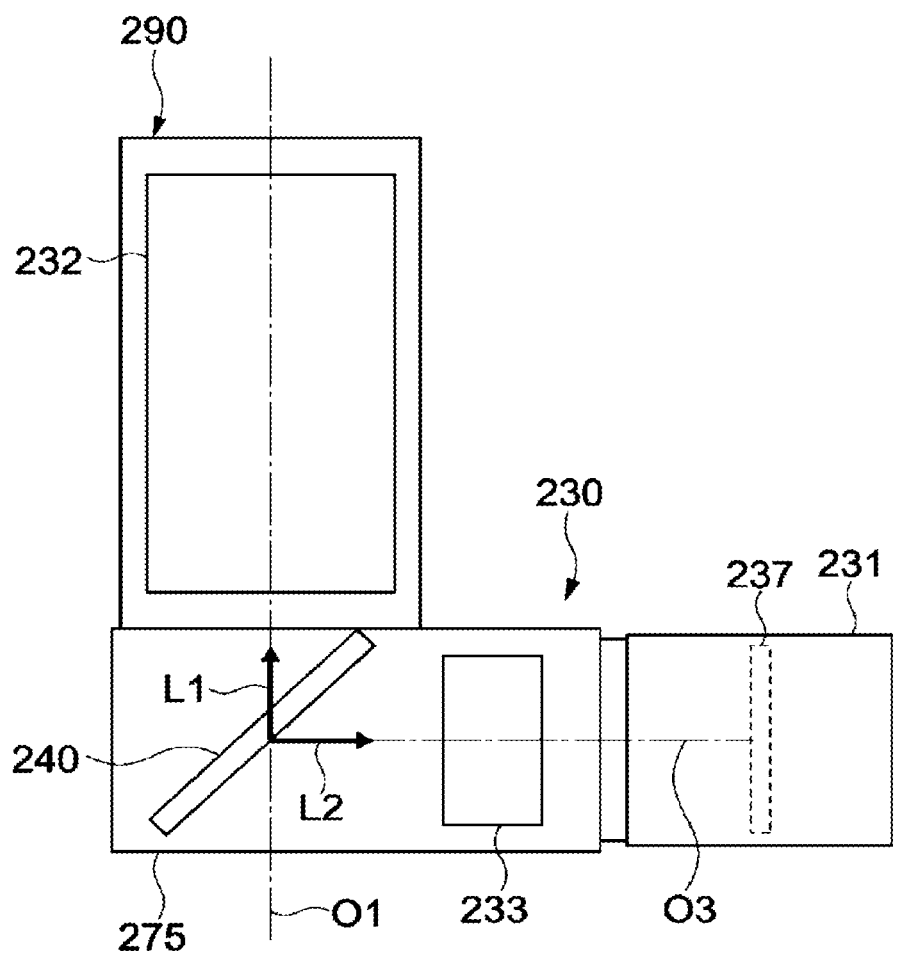
FIG. 12 is a schematic view of an example configuration of an image pickup apparatus according to another embodiment.

FIG. 12 is a schematic view of an example configuration of an image pickup apparatus according to another embodiment. In the above-described embodiment, the lens unit 30 integrally configured with the lens holding section 34 holding the projection lens section 32 is described as one embodiment of the image pickup apparatus.

The image pickup apparatus 230 illustrated in FIG. 12 can be attached to and detached from a lens unit 290 that holds a projection lens section 232 and that is not equipped with a camera. That is, a beam splitter 240, an image pickup lens section 233, and a camera 231 are integrally configured as a unit detachably attached to the lens unit 290. Note that the lens unit 290 is typically attached to and detached from a projection apparatus; however, no such limitation is intended, and the lens unit 290 may be fixed.

As illustrated in FIG. 12, a base section 275 holding the beam splitter 240 and the image pickup lens section 233 is attached to the lens unit 290. At this time, the beam splitter 240 is positioned on the optical axis O1 of the projection optical system. Before incident on the projection lens section 232, reflected light of a workpiece is split into a first split beam L1 and a second split beam L2. The projection lens section 232 magnifies the first split beam L1, and an image of the first split beam L1 is formed on the screen. Thus, a projected image of the workpiece is displayed.

The second split beam L2 travels along the optical axis O3 of the image pickup optical system and is received by an image pickup device 237 of the camera 231. Thus, a picked-up image of the workpiece can be generated. Consequently, similar to the above-described embodiment, the projected image P1 of the workpiece displayed on the screen 12 and the picked-up image P2 of the workpiece can be observed at the same time. Measurement by the image measurement software can also be performed on the basis of the picked-up image P2. That is, the function of the image measurement apparatus can be added to the projection apparatus.

No additional mechanism for equipping the beam splitter 240, the image pickup lens section 233, and the camera 231 is required to be prepared on the projection apparatus side including the lens unit 290. That is, the image pickup apparatus 230 can be readily attached to an existing projection apparatus. Thus, the function of the image measurement apparatus can be added to the projection apparatus 10 at relatively low cost. The image pickup apparatus 230 can be also readily attached to a desired lens unit 290 regardless of the magnification of the projection lens section 232, for example.

Figure 13:
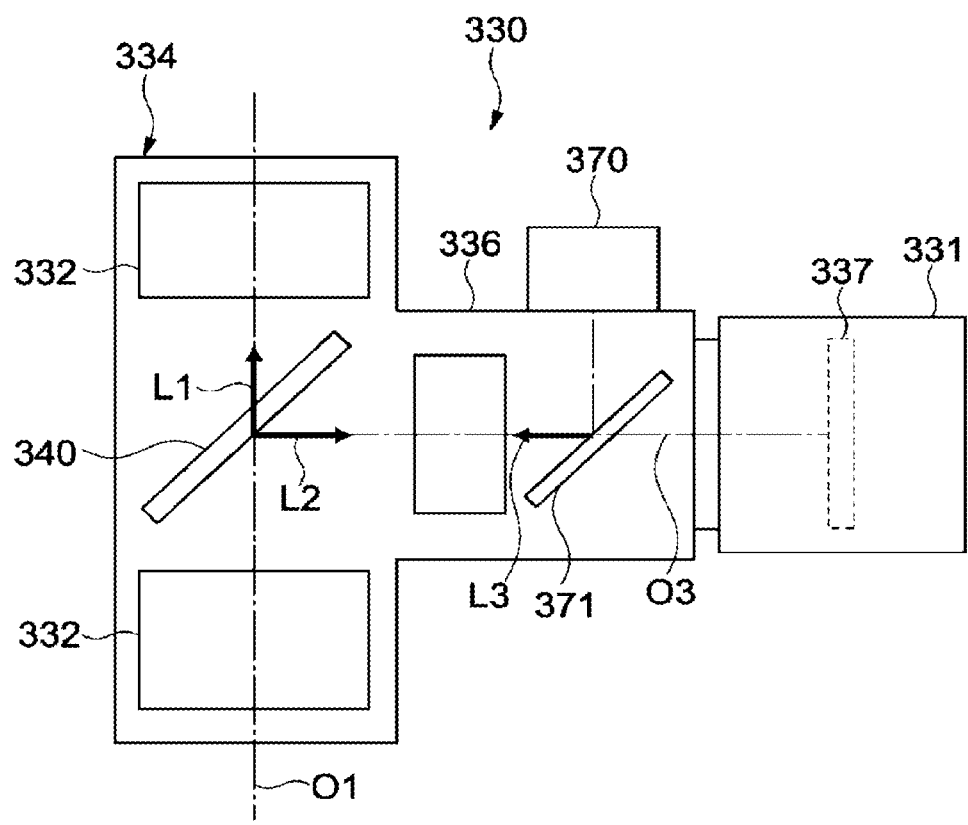
FIG. 13 is a schematic view of an example configuration of an image pickup apparatus according to still another embodiment.

FIG. 13 is a schematic view of an example configuration of an image pickup apparatus according to still another embodiment. In this embodiment, a lens unit 330 integrally configured with a lens holding section 334 holding a projection lens section 332 is used as an image pickup apparatus. The lens holding section 334 corresponds to a base section.

As illustrated in FIG. 13, the lens unit 330 includes a light source section 370 disposed at a connection portion 336 connected with a camera 331 and a beam splitter 371 disposed on the optical axis O3 of the image pickup optical system.

The light source section 370 is composed of, for example, an LED, and emits illuminating light toward the beam splitter 371. The beam splitter 371 emits light emitted from the light source section 370 along the optical axis O3 of the image pickup optical system toward a beam splitter 340 disposed on the optical axis O1 of the projection optical system, as illuminating light L3. The illuminating light L3 being part of the light emitted from the light source section 370 thus reversely travels through the image pickup optical system and is radiated along the optical axis O1 of the projection optical system to a workpiece. This configuration readily enables coaxial epi-illumination.

The beam splitter 340 disposed on the optical axis O1 of the projection optical system corresponds to a first beam splitter. The beam splitter 371 disposed on the optical axis O3 of the image pickup optical system corresponds to a second beam splitter. The optical axis O3 of the image pickup optical system corresponds to the optical axis of an optical system guiding a second split beam L2 generated through splitting at the first beam splitter 340 to an image pickup device 337. Note that in the example illustrated in FIG. 13, part of the image pickup optical system corresponds to the aforementioned optical system.

The light source section 370 and the beam splitter 371 function as an illuminator section radiating light to the workpiece when the lens holding section 334 is attached.

The light source section and the beam splitter for epi-illumination illustrated in FIG. 13 may be equipped to the image pickup apparatus 230 illustrated in FIG. 12. In this case, the image pickup optical system corresponds to an optical system guiding the second split beam L2 generated through splitting at the beam splitter 240 to the image pickup device 237.

In the above description, the image pickup apparatus according to the present technique can be attached to and detached from the projection apparatus and can be used as an add-on to an existing projection apparatus. No such limitation is intended, and the image pickup apparatus according to the present technique fixed to the projection apparatus or including an additional holding mechanism as the unit holding section is also included in the image pickup apparatus, the optical measurement apparatus, and the measurement system according to the present technique. These configurations also enable measurement on the basis of a projected image of a subject displayed on the screen and a picked-up image of the subject. That is, both the function of the projection apparatus and the function of the image measurement apparatus can be achieved. Thus, the measurement accuracy and measurement workability can be improved.

The beam splitter may be disposed in any position in the projection optical system. The beam splitter disposed in the vicinity of the projection lens section as described above is advantageous in that the apparatus can be reduced in size; however, the beam splitter may be disposed in another position.

In the measurement system 100 illustrated in FIG. 1, the projection apparatus 10 corresponds to a measurement section (measurement apparatus), and the data processing apparatus 50 corresponds to a measurement processing section (measurement processing apparatus). The monitor apparatus 60 corresponds to a display section. An apparatus including all these components may be configured as an optical measurement apparatus according to the present technique. Additionally, an apparatus in which the measurement section and the measurement processing section are integrally configured or an apparatus in which the measurement section and the display section are integrally configured may be configured as an optical measurement apparatus according to the present technique.

In the above description, the projection apparatus is exemplified as the optical measurement apparatus. No such limitation is intended, and the present technique can be applied to a desired optical measurement apparatus projecting an image of a subject on a screen.

At least two of the above-described features may be combined. The above-described different effects are merely examples and are not limited, and other effects may be exhibited.

REFERENCE SIGNS LIST

L1 First split beam
L2 Second split beam
L3 Illuminating light
O1 Optical axis of projection optical system
O2 Optical axis of projection lens section
O3 Optical axis of image pickup optical system
P1 Projected image
P2 Picked-up image
5 Reference chart
6 Reference chart image
10 Projection apparatus
12 Screen
20 Projection optical system
25 Ring illuminator section
30, 330 Lens unit
31, 231, 331 Camera
32, 232, 332 Projection lens section
33, 233 Image pickup lens section
34, 334 Lens holding section
37, 237, 337 Image pickup device
40, 240, 340, 371 Beam splitter
50 Data processing apparatus
51 Image measurement software
60 Monitor apparatus
61 Measurement GUI
100 Measurement system
230 Image pickup apparatus
275 Base section
370 Light source section

The invention claimed is:
1. An image pickup apparatus, comprising:
a splitter device configured to detachably attach to an optical projection system configured to project an image of a subject on a screen; and
an illuminator configured to radiate light onto the subject via the splitter device, wherein
the splitter device includes:
a beam splitter disposed on an optical axis of the optical projection system upon attachment of a base to an optical measurement apparatus; and image pickup circuitry including an image pickup device configured to receive first light generated through splitting at the beam splitter, the image pickup circuitry configured to capture an image of the subject upon attachment of the base, wherein the beam splitter is positioned between the image pickup device and the subject, wherein the beam splitter, in the splitter device configured to detachably attach to the optical projection system, is configured to split an input light into the first light entering the image pickup device and a second light entering the optical projection system to be projected by the optical projection system, and wherein the beam splitter is a first beam splitter, the image pickup circuitry includes an optical system configured to guide light generated through splitting at the first beam splitter to the image pickup device, and the illuminator includes a light source and a second beam splitter disposed on an optical axis of the optical system and configured to split light emitted from the light source and to emit the light along the optical axis of the optical system to the first beam splitter.

2. The image pickup apparatus according to claim 1, wherein the splitter device is configured to be detachably attached to the optical projection system via a holding mechanism.

3. The image pickup apparatus according to claim 2, wherein the optical projection system includes a lens group configured to function as a projection lens system of the optical projection system upon attachment of the splitter device.

4. The image pickup apparatus according to claim 1, wherein the illuminator includes a ring illuminator disposed around the optical axis of the optical projection system upon attachment of the splitter device.

5. The image pickup apparatus according to claim 1, wherein the image pickup circuitry includes an image pickup lens group configured to reduce or magnify light generated through splitting at the beam splitter and to guide the light to the image pickup device.

6. The image pickup apparatus according to claim 5, wherein the optical projection system includes a projection lens group configured to function as a projection lens system of the optical projection system upon attachment of the splitter device, the projection lens group is configured to magnify an image of the subject with a predetermined magnification upon attachment of the splitter device, and the image pickup lens group configured to reduce light generated through splitting at the beam splitter with a magnification corresponding to the predetermined magnification and to guide the light to the image pickup device.

7. An optical measurement apparatus, comprising:

a screen;

an optical projection system configured to project an image of a subject on the screen and detachably connected to a splitter device;

an illuminator configured to radiate light onto the subject via the splitter device; and the splitter device including a beam splitter disposed on an optical axis of the optical projection system; and image pickup circuitry including an image pickup device configured to receive light generated through splitting at the beam splitter, the image pickup circuitry configured to obtain an image of the subject, wherein the beam splitter is positioned between the image pickup device and the subject, wherein the beam splitter, in the splitter device configured to detachably attach to the optical projection system, is configured to split an input light into first light entering the image pickup device and a second light entering the optical projection system to be projected by the optical projection system, and wherein the beam splitter is a first beam splitter, the image pickup circuitry includes an optical system configured to guide light generated through splitting at the first beam splitter to the image pickup device, and the illuminator includes a light source and a second beam splitter disposed on an optical axis of the optical system and configured to split light emitted from the light source and to emit the light along the optical axis of the optical system to the first beam splitter.

8. A measurement system, comprising:

(a) the optical measurement apparatus according to claim 7; and (b) a measurement processing apparatus including circuitry configured to perform measurement processing on the subject on a basis of image pickup data acquired by the image pickup circuitry.

9. The measurement system according to claim 8, further comprising a display configured to display an image of the subject on a basis of the image pickup data acquired by the image pickup circuitry.

* * * * *

UNITED STATES PATENT AND TRADEMARK OFFICE
CERTIFICATE OF CORRECTION

| | |
|---|---|
| PATENT NO. | : 11,119,395 B2 |
| APPLICATION NO. | : 16/031406 |
| DATED | : September 14, 2021 |
| INVENTOR(S) | : Ryusuke Kato et al. |

It is certified that error appears in the above-identified patent and that said Letters Patent is hereby corrected as shown below:

In the Drawings

On sheet 9 of 13, FIG. 9, Tag "63", Line 1, delete "DETCTION" and insert -- DETECTION --, therefor.

On sheet 9 of 13, FIG. 9, Tag "63", Line 5, delete "MEASUREMENI" and insert -- MEASUREMENT --, therefor.

On sheet 11 of 13, FIG. 11B, Line 1, delete "DETCTION" and insert -- DETECTION --, therefor.

In the Specification

In Column 5, Line 17, delete "di splayed." and insert -- displayed. --, therefor.

Signed and Sealed this
Tenth Day of May, 2022

Katherine Kelly Vidal
*Director of the United States Patent and Trademark Office*